UNITED STATES PATENT OFFICE.

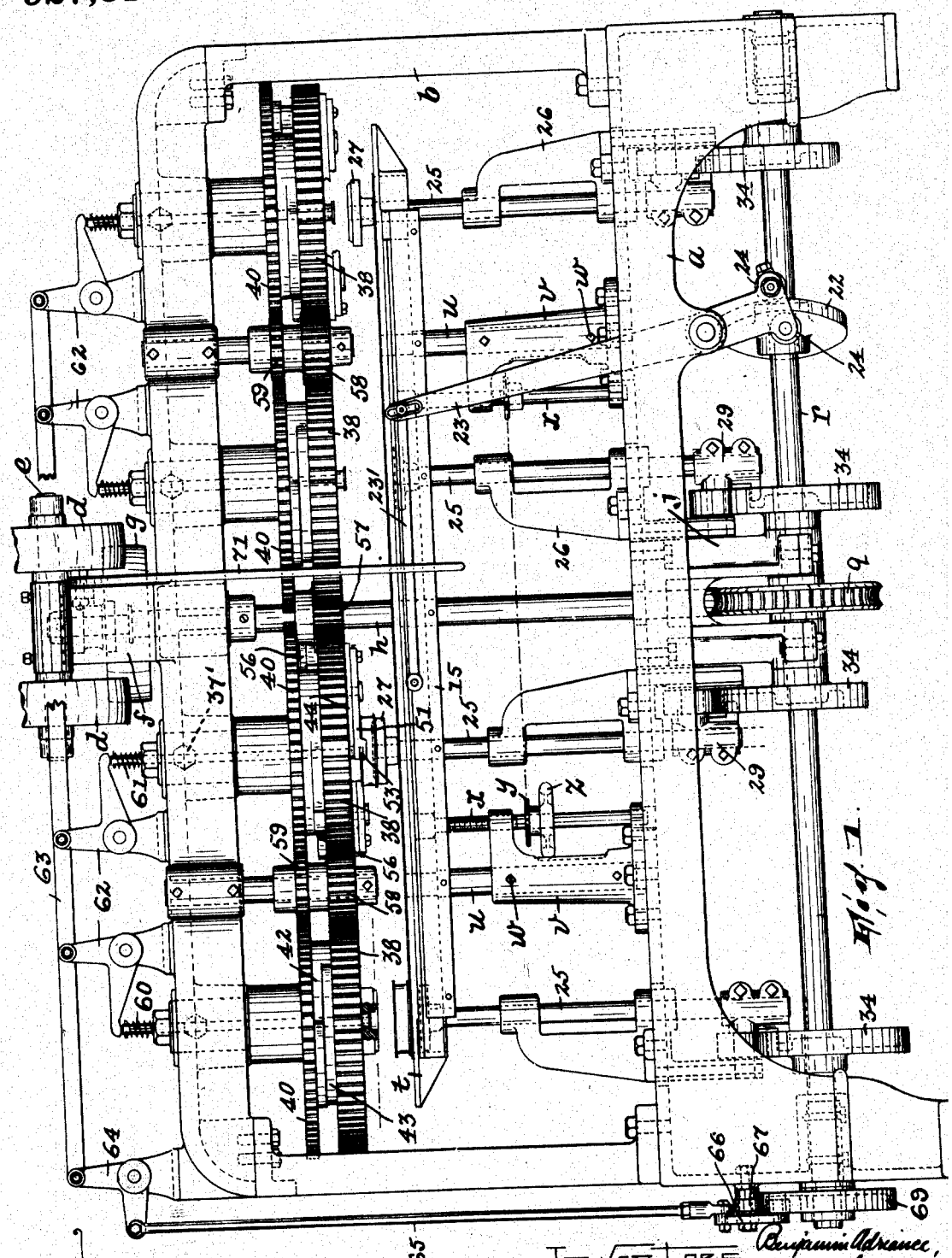

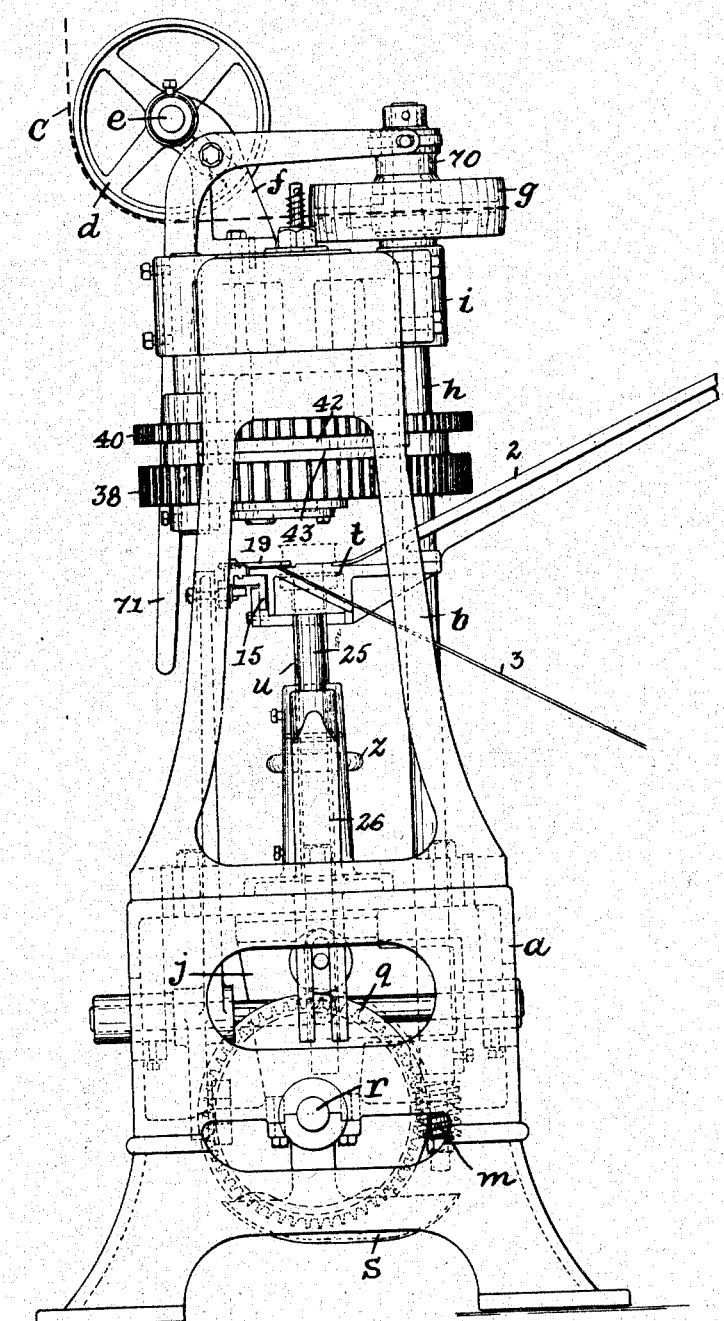

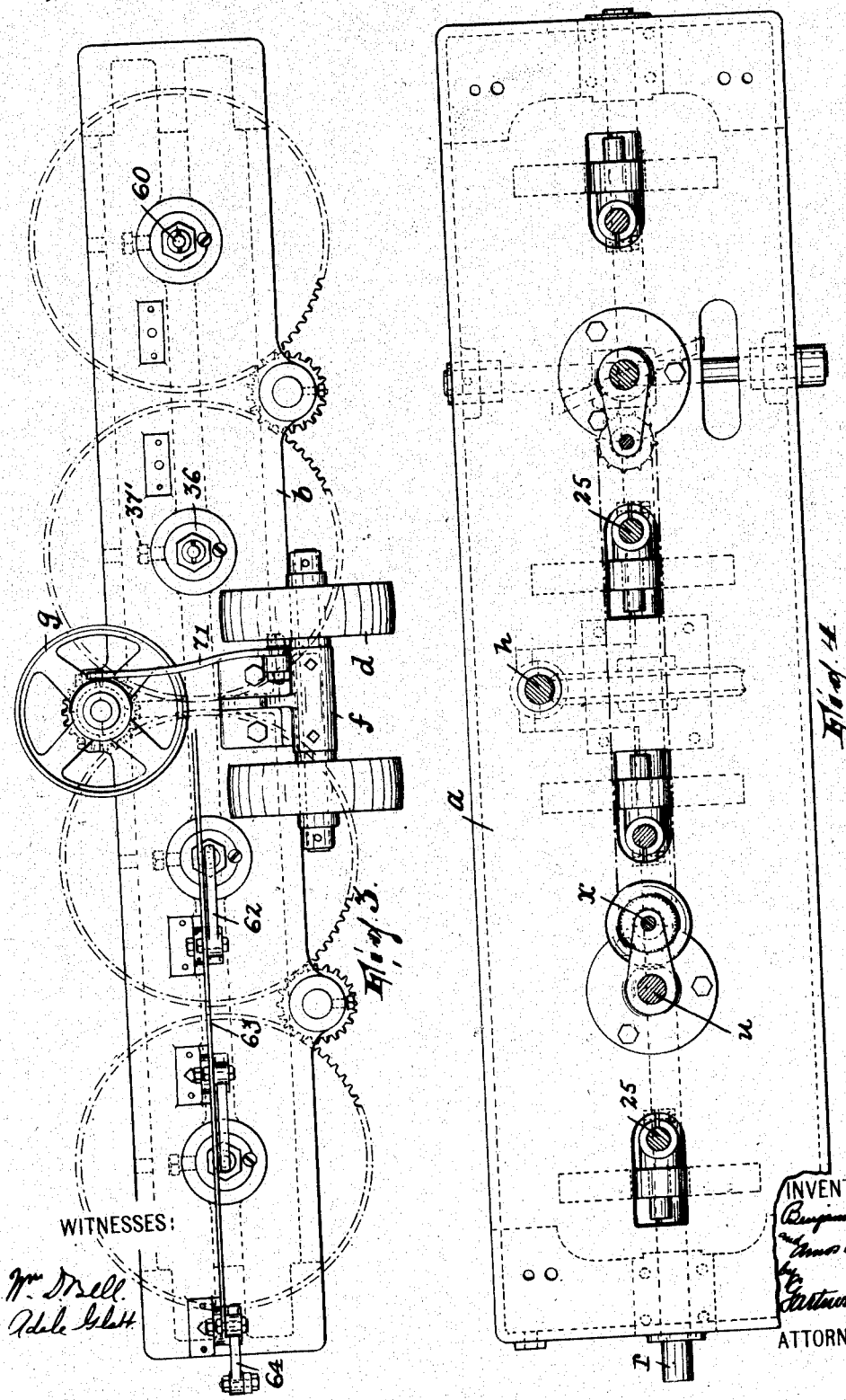

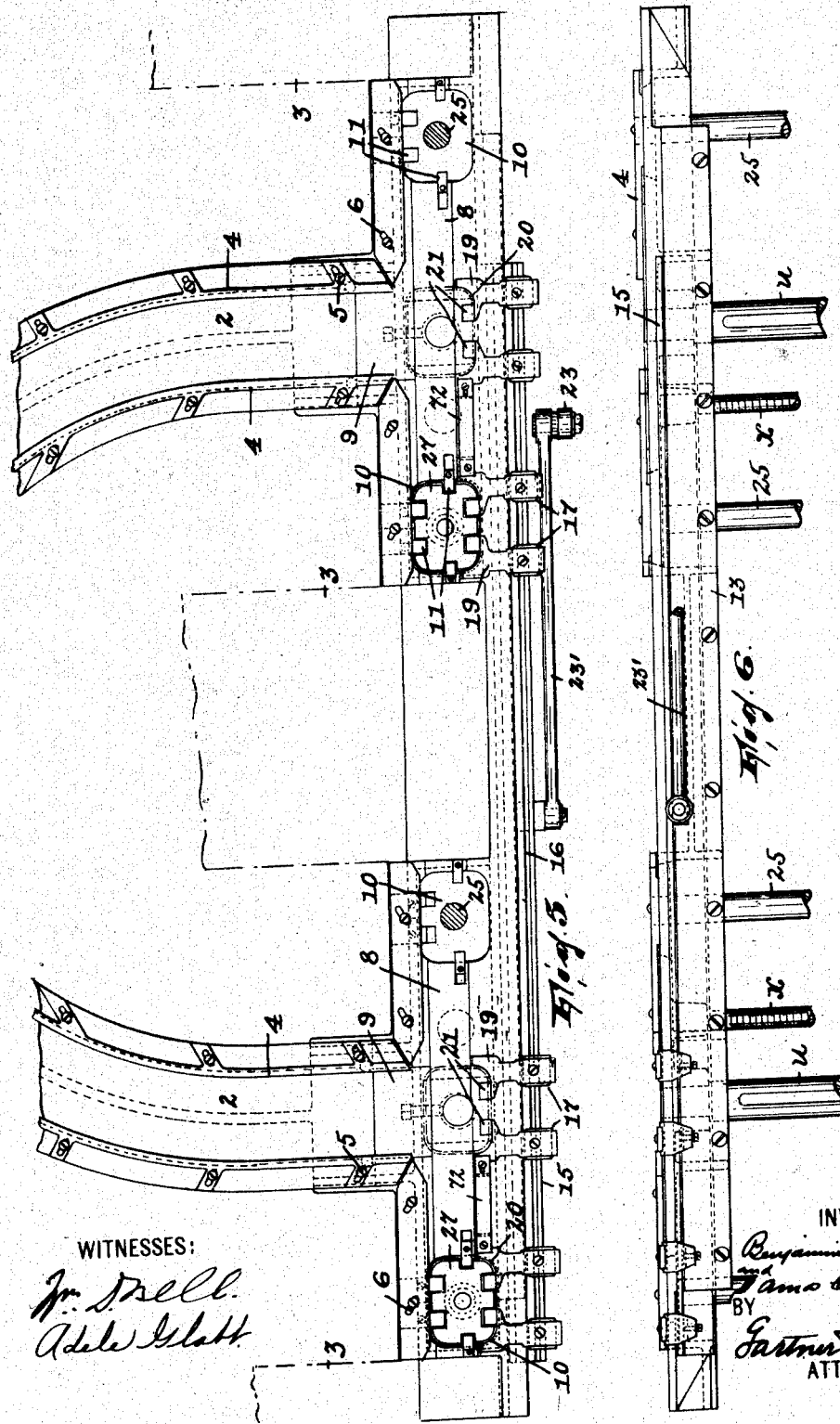

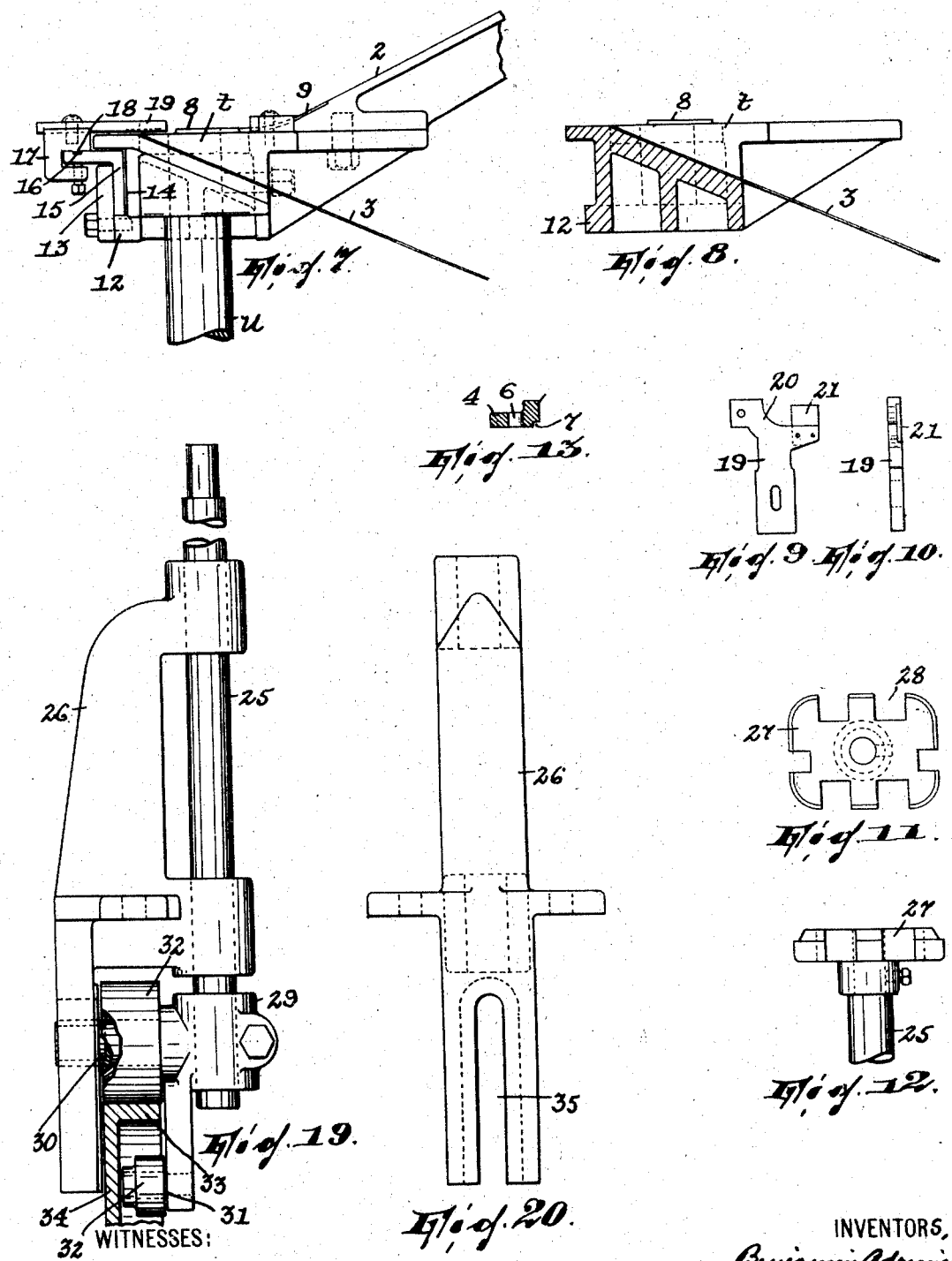

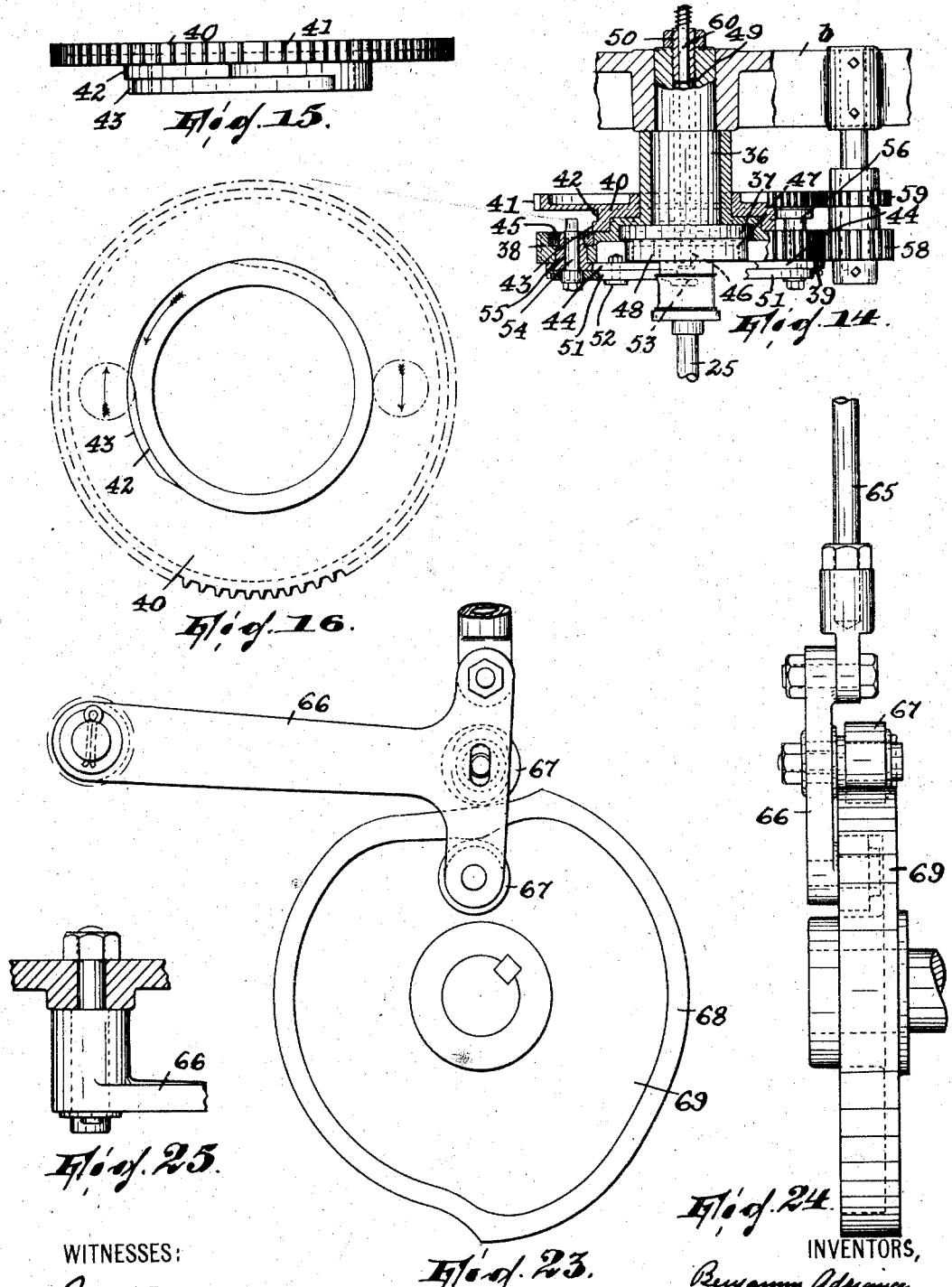

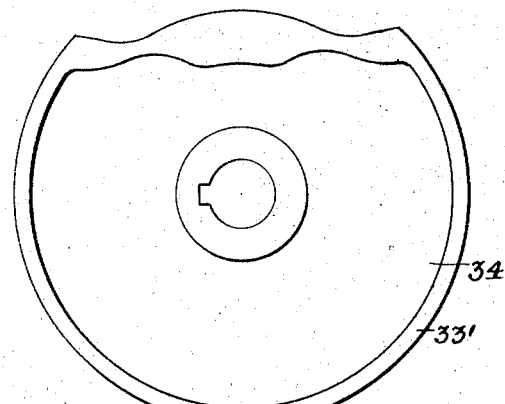
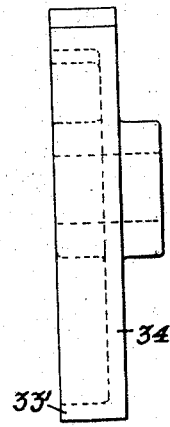
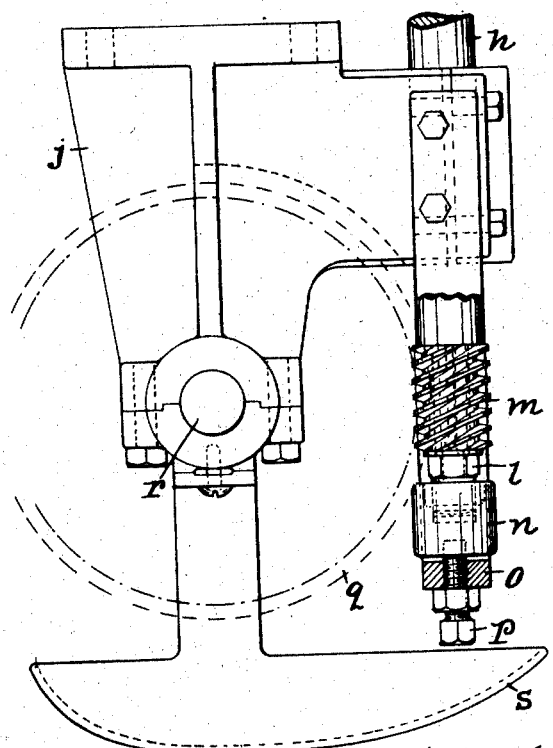
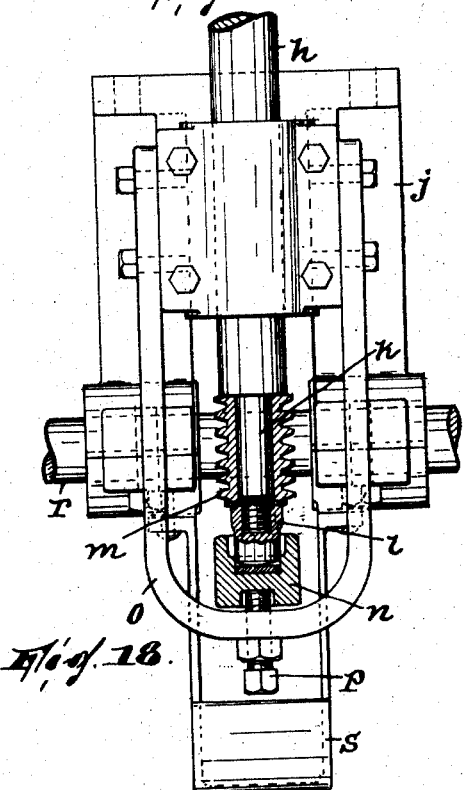

BENJAMIN ADRIANCE AND AMOS CALLESON, OF BROOKLYN, NEW YORK; SAID CALLESON ASSIGNOR TO SAID ADRIANCE.

MULTIPLE CAN-HEADING MACHINE.

No. 927,310.   Specification of Letters Patent.   Patented July 6, 1909.

Application filed February 28, 1905. Serial No. 247,766.

*To all whom it may concern:*

Be it known that we, BENJAMIN ADRIANCE and AMOS CALLESON, citizens of the United States, residing in Brooklyn, county of Kings, and State of New York, have invented certain new and useful Improvements in Multiple Can-Heading Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

Our present invention relates to multiple can-end-seaming or can-heading machinery, and it has for its principal object to provide such a combination of a seaming mechanism with work-feeding means as will conduce to a very considerable increase of output and consequently require less skilful and careful attention on the part of operatives. We prefer to employ and herein describe a heading mechanism of the type illustrated in our application for U. S. Letters Patent filed June 17, 1903, Serial No. 161,777, wherein shaping (seaming) devices, their actuating means and the means for holding the work are so constructed and arranged that a relative rotary movement as to two of them causes the shaping devices to operatively engage, travel around and then leave the work, all in the operation of forming a seam.
Our invention is broadly characterized by a plurality of seaming units in combination with a feed arrangement which involves the distributing of the work to the seaming units by a means which takes work from a supply point and delivers it to the seaming units, one after the other. In the present adaptation, said means takes work from the supply to one seaming unit, moves back to the supply to be replenished, takes work to the other seaming unit, and so on. Thus while the function of supplying one seaming unit is being performed, the other can be effecting seaming, which obviously increases the output. This operation is distinguished from that of machines of the kind typified in our application filed Oct. 24, 1903, Ser. No. 178,380, where the seaming units move to receive the work instead of having it brought to them.

In the accompanying drawings, Figure 1 is a view of the machine in front elevation; Fig. 2 is a view looking at the right-hand end thereof; Fig. 3 is a top plan view; Fig. 4 is a horizontal sectional view taken just below the distributing table; Fig. 5 is a horizontal sectional view taken just above the distributing table; Fig. 6 is a view in front elevation of said distributing table and its accessories; Fig. 7 is a view in end elevation of what is seen in Fig. 6; Fig. 8 is a vertical sectional view of the distributing table with its accessories removed; Figs. 9 and 10 are plan and side views, respectively, of one of a pair of can shifting devices; Figs. 11 and 12 are plan and side views of a plunger forming a part of one of the work holders; Fig. 13 is a sectional view of one of certain guides; Fig. 14 is a view partly in side elevation and partly in section of one of the seaming units; Figs. 15 and 16 are, respectively, a side view and underneath view of one of the parts shown in Fig. 14; Figs. 17 and 18 are front and side views, respectively, each partly in section, of a portion of the means for transmitting the power from the counter-shaft to the main shaft. Fig. 19 is a view in front elevation, partly in section, of the means for imparting motion to the plunger shown in Figs. 11 and 12; Fig. 20 is a front view of a bracket shown in Fig. 19; Figs. 21 and 22 are side and front views, respectively, of a certain cam shown in Fig. 19; Figs. 23 and 24 are side and front views, respectively, of a part of the means for actuating the ejecting mechanism; and Fig. 25 illustrates a detail of the mechanism shown in Figs. 23 and 24.

In the drawings, the frame of the machine is shown as comprising a base $a$ and an arch $b$ resting thereon. The power is taken into the machine by a belt $c$ which extends under pulleys $d$ journaled on the shaft $e$, which is mounted in a bracket $f$ in the arch $b$, and then around a pulley $g$ on a vertical shaft $h$ having a bearing at $i$ in the arch $b$ and also a bearing in a bracket $j$ suspended from the base $a$. On the reduced lower end $k$ of said shaft $h$ is secured, by means of a cap $l$ screwed on said shaft, a worm $m$ (which is also keyed to the shaft), and said cap seats in a cup $n$ as a step-bearing, said cup being adjustably suspended in a stirrup $o$, depending from bracket $j$, by a set-screw $p$. The worm is in mesh with a worm-wheel $q$ on the main horizontal shaft $r$, which is journaled in the base and in bracket $j$.

$s$ is an oil cup suspended from bracket $j$ and disposed under the bearing for shaft $r$ in said bracket and under shaft $h$.

$t$ is a table carried by shafts $u$ arranged for vertical adjustment in pedestals $v$ resting on base $a$ and adapted to be fixed in said pedestals against vertical displacement by set-screws $w$. In order to jack the table up to any desired height, the set-screws are loosened and then adjusting shafts $x$, which bear against the under side of the table and have threaded engagement with the pedestals $v$, are turned, said shafts being connected by a sprocket and chain arrangement $y$, so that they operate together. One of the shafts $x$ may carry a hand-wheel $z$ whereby to rotate it. The table is provided with two supply chutes 2 which incline toward it and discharge chutes 3 which incline away from the table, alternating with the chutes 2.

4 are guides which form the sides of the chutes 2 and the back wall of the table, they being right angular in form (see Fig. 5) and adjustable, to vary the width of said chutes and the depth (i. e., front to back dimension) of the table, by means of securing screws 5 arranged in oblique slots 6 in the guides. Since the cans and their covers are of the laterally flanged type, the bottom portion of each guide 4 is rabbeted on the inside, as at 7, Fig. 13, to receive the can flanges.

The top of the table has slightly elevated can slide-ways 8, flush approach to each of which at the back thereof from each chute 2 is afforded by a fillet 9 (see Figs. 5 and 7). Substantially at the ends of these slide-ways are openings 10, which mark the positions of the cans while being seamed or headed.
Each opening 10 is of slightly greater dimensions than the cans, and projecting into it with their top surfaces substantially flush with the top surface of the slide-way are can-supporting fins 11. The cans are slid onto these fins and there remain until they are passed to the seaming or heading operation. The means for moving the cans to this position may now be described.

The front of the table $t$ has a horizontal rib or flange 12 extending along its lower edge, and to this flange is secured a plate 13 forming with the front face of said table a guide-way 14. In this guide-way slides the vertical portion of a cross-sectionally L-shaped rail 15 whose horizontal portion is formed with a longitudinal groove 16 in the top surface thereof. Clips 17, having ribs 18 which fit into said groove, are secured on the rail 15 by set-screws, there being four pairs of these clips, two corresponding to the right-hand chute 2 and two to the left-hand chute 2. To said clips are secured, as by screws, can-shifters 19 whose inner ends are recessed to receive the corners of the cans, as at 20, and are formed with projecting can-supporting fins 21; said clips extend over the lower front portion of the table $t$, so that the tops of their fins are not appreciably, if any, higher than the top surface of the slide-ways 8. The rail 15 has a reciprocating movement corresponding to the distance from a point directly opposite the middle of either chute 2 to the center of one of the corresponding two openings 10, and the four pairs of can-shifters are so distanced from each other that, with respect to either the right- or left- hand two, one pair in each alternately opposes itself in the reciprocations of said rail to the chute 2 and to one of the two openings 10 corresponding to said chute. The rail is reciprocated from a laterally pitched cam 22 on shaft $r$ through the medium of a lever 23 fulcrumed in the base $a$ and carrying anti-friction rolls 24 embracing said cam and a pitman 23′ connecting said lever with the rail.

25 are plungers vertically alined with the openings 10 and guided for vertical movement in brackets 26 mounted in the base $a$; the heads 27 of these plungers form the lower members of the can holding means or chucks and they are cut out, as at 28, so as to pass the fins 11 and 21. To each plunger is bolted a sleeve 29 carrying trunnions 30, 31 on which are antifriction rolls 32 which receive between them the lateral cam-way 33 of a cam 34 on shaft $r$; the trunnion is guided in a slot 35 of the bracket 26.

The seaming units are four in number, two to each chute 2. Describing one of these units: 36 is a post formed with a flange 37 at its lower end and secured in the arch $b$ by a set-screw 37′. A revoluble disk 38 is supported by this flanged post and has peripheral gear teeth 39. On the disk is journaled an annulus 40 formed with peripheral gear teeth 41 and having two peripheral cam-ways 42 and 43, said cam-ways being relatively between the teeth of the disk and annulus. At diametrically opposite points in the disk are arranged pairs of levers which are substantially alike, so description of but one is necessary.

44 is a lever fulcrumed in the disk, its fulcrum being a boss formed integrally with it and carrying a nut 45 for securing the lever in place; the free end of this lever carries a roll 46 which runs in a groove 47 in the under face of a block 48 which co-acts, as the upper chuck with one of the heads 27 of the plungers aforesaid to hold the can, said groove having substantially a shape corresponding to the contour of the can to be operated upon. Block 48 has a tubular spindle 49 which projects up through post 36 and is secured in the same by a nut 50. Lever 44 and another lever 51 are pivoted together at approximately their middle portion, as at 52; the free end of lever 51 carries a knurl 53, while its other end carries a stud 54 which projects up through a slot 55 in the fulcrum portion of lever 44 and carries at its upper end an antifriction roll 56. Two such mechanisms as this belong to each seaming unit, they being exactly alike except that the knurl 53 for the one is shaped to perform the primary bending while the other is shaped to finish the seaming. Levers 51 are directly involved in shaping the metal; levers 44 simply serve as their supports. The former take their general direction of movement from the latter, but the direct actuation thereof in order to shape the metal is imparted thereto by the cams 42 and 43, the roll 56 of the one engaging cam 42 while the roll of the other engages cam 43. No broad claim for a mechanism, per se, of this nature is made in the present instance, provision to that end having been made in our application first above mentioned. The power to drive these several seaming units is taken from the shaft h through a pinion 57 which meshes with the gear-teeth on the disks 38 of the two adjacent units. It is transmitted to the gear-teeth of the disks of the other units by idler pinions 58, as shown in Fig. 1, and to the gear-teeth 41 on the annuli 40 by idler pinions 59 each of which connects the two annuli 40 of each pair of seaming units. The pitch of the gearing throughout is such that the disks of all the units rotate faster than the annuli, with the consequence that the rolls 56 are actuated by the cams 42 and 43 and so actuate levers 51. Thus while said levers are moving about the work they are either pressed by the cams against it or permitted to recede.

60 is a plunger or can-ejector extending through each spindle 49 and normally pressed upwardly by spring 61. Against the top of these plungers impinge bell-crank levers 62 which are in common actuated from a bar 63. This bar is connected by a bell-crank lever 64 with a pitman 65 pivotally connected with a crank 66, pivoted in the base a and carrying antifriction rolls 67 which receive the lateral flange 68 of a cam 69 secured on shaft r.

70 is a clutch of some common type for disconnectively connecting pulley g with shaft h, and 71 is a handle for operating this clutch.

Operation: The parts being in the position shown in the drawings, the cans are fed down chutes 2, the first can in each instance being received by the opposed pair of can-shifters 19. The machine is then started by moving handle 71 which sets the several seaming units and the shaft r rotating. Cam 22 now shifts the rail 15 to the right, the shifters 19 moving the two first cans on to the fins 11 over the openings 10. The cams 34 then raise the plungers 25, the heads of which press the cans up against the chucks 48. At this time, the knurls of the two 48 seaming units involved are back, permitting the can to rise, but in due time they are pressed inwardly by the cams 42 and 43 and effect the seaming. Meantime, cam 22 has shifted the rail 15 to the left, the two second cans being likewise shifted by the devices 19. This brings said cans over the fins 11 of the left-hand openings 10, whereupon the left-hand plungers rise under the action of their cams 34 to lift the cans into the operative control of the corresponding seaming units, which latter ultimately effect the seaming of said cans. Meantime, the cams for the two right-hand plungers have dropped, lowering the now-finished two first cans onto the fins 11. The shifting devices now move again from left to right, carrying with them the third two cans, which are to go through the same operation as their predecessors. As these cans approach the openings 10, they displace the finished cans to the right and onto the chutes 3, down which the latter slide, leaving the machine. This last operation is reproduced by the fourth two cans on the third two, at the left-hand openings 10, and so on. It will be of course understood that the cam 69 is so timed with relation to the operation above described that at the proper moment it causes the plungers 60 to be depressed to cause the finished cans to detach themselves from the chucks 48.

72 is a guard which connects the two adjacent can-shifters 19 in each two pair of said can-shifters and which is close enough to the back wall of the table t to prevent a can from slipping down in position to be engaged by said can-shifters until the proper pair of the latter is directly opposed to the chute 2.

Having thus fully described our invention, what we claim and desire to secure by Letters Patent is:

1. The combination of a plurality of seaming units, a work supply means, said seaming units having a substantially constant location relatively to the supplying means and a means for moving the work from the supply means to the seaming units, alternately, said means being movable from the supply means to the seaming units, substantially as described.

2. The combination of a plurality of seaming units, a work supply means, said seaming units having a substantially constant location relatively to the supplying means and a means for moving the work from the supply means to the seaming units, alternately, said means being movable back and forth between the supply means and, alternately, the seaming units, substantially as described.

3. The combination of a plurality of seaming units, a work supply located substantially between said units and said seaming units having a substantially constant location relatively to said supplying means, and a means for moving the work from the supply to the said seaming units, alternately substantially as described.

4. The combination of a guide-way, a plurality of seaming units having a substantially constant location relatively to said guide-way, a means for delivering the work onto said guide-way, and a means for sliding the work over said guide-way from the point of its delivery onto said guide-way to the said seaming units, alternately, substantially as described.

5. The combination of a guide-way, a plurality of seaming units having a substantially constant location relatively to said guide-way, a means for delivering the work onto said guide-way at a point substantially between said seaming units, and a means for moving the work from the point of its delivery onto the guide-way to the said seaming units, substantially as described.

6. The combination of a work supplying means, a plurality of seaming units having a substantially constant location relatively to said supplying means, and means for moving the work from the supplying means into the operative control of the seaming units alternately, substantially as described.

7. The combination of a work supply means, a plurality of seaming units and said seaming units having a substantially constant location relatively to said supplying means, the point of delivery of the work supply means being substantially midway between said seaming units, and a means for moving the work from the delivery point of the supply means into the operative control of the seaming units, said means comprising alternating work shifting members spaced from each other a distance corresponding to the distance between the supply means delivery point and each of said units, substantially as described.

8. The combination of a guide-way, a plurality of seaming units having a substantially constant location relatively to said guide-way, a means for delivering the work onto said guide-way at a point substantially between said seaming units and a reciprocating work-shifting means, substantially as described.

9. The combination of a guide-way, a means for delivering the work onto said guide-way, a seaming means, said guide-way and the seaming means being located at different horizontal planes, a work-chuck or holder movable from the guide-way toward the seaming means, and vice versa, and a means for moving the work over the guide-way from the point of delivery thereon to the chuck, substantially as described.

10. The combination of a guide-way, a plurality of seaming units, a means for delivering the work onto said guide-way at a point substantially between the seaming units, means, coactive with each seaming unit, for holding the work; and a reciprocatory means for moving the work over the guide-way from the work receiving point thereof to said chucks, alternately, substantially as described.

11. The combination of a guide-way having vertical openings therethrough, a means for delivering the work onto said guide-way between said openings, seaming units located in a different horizontal plane from that of the guide-way, a work-holder movable through each opening and co-active with each seaming unit to hold the work, one for each seaming unit, and a means for moving the work over the guide-way from the work receiving point thereof to said openings, substantially as described.

12. The combination of a plurality of seaming units, a work supplying means, a work shifting means, the latter having a reciprocating movement between the seaming units and past the supplying means, and means for causing said work shifting means to move, substantially as described.

In testimony, that we claim the foregoing, we have hereunto set our hands this 20th day of January, 1905.

BENJAMIN ADRIANCE.
AMOS CALLESON.

Witnesses:
WILLIAM C. HORN,
HENRY A. PHILLIPS.